(12) United States Patent
Schmidt

(10) Patent No.: US 6,309,758 B1
(45) Date of Patent: Oct. 30, 2001

(54) PROMOTED POROUS CATALYST

(75) Inventor: Stephen Raymond Schmidt, Silver Spring, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/306,398

(22) Filed: May 6, 1999

(51) Int. Cl.[7] .............................. B01J 27/13; B01J 23/40
(52) U.S. Cl. .................. 428/570; 427/305; 427/306; 427/437; 427/443.1; 502/301; 502/325; 502/337; 428/550
(58) Field of Search ..................................... 428/570, 550; 427/437, 443.1, 305, 306; 502/301, 325, 337

(56) References Cited

U.S. PATENT DOCUMENTS

| | | |
|---|---|---|
| 3,213,141 | 10/1965 | Graham et al. . |
| 3,230,259 | 1/1966 | Levy . |
| 3,278,598 | 10/1966 | Markiewitz . |
| 3,326,725 | 6/1967 | Guth et al. . |
| 3,781,227 | 12/1973 | Sokolsky et al. . |
| 4,043,946 | 8/1977 | Sanker et al. . |
| 4,111,840 * | 9/1978 | Best . |
| 4,153,578 | 5/1979 | DeThomas et al. . |
| 4,182,721 | 1/1980 | DeThomas et al. . |
| 4,224,248 | 9/1980 | Birkenstock et al. . |
| 4,701,434 * | 10/1987 | Koll . |
| 4,717,774 | 1/1988 | Narayan et al. . |
| 4,743,577 * | 5/1988 | Schroeder et al. . |
| 4,792,626 | 12/1988 | Becher et al. . |
| 4,895,994 | 1/1990 | Cheng et al. . |
| 5,554,573 * | 9/1996 | Cordier et al. . |
| 5,801,286 | 9/1998 | Besson et al. . |

FOREIGN PATENT DOCUMENTS

| | | | |
|---|---|---|---|
| 43309 | 1/1982 | (EP) | .............. C07C/45/00 |
| 734765 | 10/1996 | (EP) | .............. B01J/25/02 |
| 1119512 | 9/1965 | (GB) . | |
| 6512226 | 9/1965 | (NL) . | |

OTHER PUBLICATIONS

Reduction of Nitroguanidine. VI. Promoter Action of Plantinic Chloride on Raney Nickel Catalyst; Lieber et al; JAC 58, 1417 (1936) no month.
The Promoter Effect of Platinic Chloride on Raney Nickel. II. Effect of Alkali on Various Groups; Reasenberg et al; JACS 61, 384 (1939) no month.
The Promoter Effect of Platinic Chloride on Raney Nickel. I. General Effects on Type W–6 Catalyst; Levering et al; JAC 72, 1190 (1950) no month.
The Hydrogenation of Nitro Compounds with Raney Nickel Treated with Chloroplatinic Acid and Alkali; Samuelsen et al; JACS 72 3872 (1950) no month.
Sur L'Hydrogenation de Quelque Composes Carbonyles par le Nickel, Delepine et al, Compt. Rend, 201 1301 (1935) C.A. 30 1776 (1935) no month.
Hydrogenation des composes carbonyles par le nickel Raney, recouvert des metaux de la famille du platine. Influence des alcalis. Delepine et al; Compt. Rend 202 995 (1936) no month.
Catalysis of Hydrogenation; A.S. Gingberg et al. J. Russ. Phys, Chem Soc 62 1991 (1930) C.A. 25 4173 (1931) no month.
The Promoter Effect of Platinic Chloride on Raney Nickel; Levering et al; JACS 71 1515 (1949) no month.

* cited by examiner

*Primary Examiner*—Deborah Jones
*Assistant Examiner*—Jason Savage
(74) *Attorney, Agent, or Firm*—Robert A. Maggio; Howard J. Troffkin

(57) ABSTRACT

A novel precious metal doped porous metal catalyst is disclosed. The precious metal is present in from 0.01 to 1.5 weight percent and distributed throughout the particles of porous metal to provide a surface to bulk ratio distribution of not greater than 60. The present invention is further directed to a process of forming said doped catalyst and to improved processes of catalytic hydrogenation of organic compounds.

39 Claims, No Drawings

PROMOTED POROUS CATALYST

BACKGROUND OF THE INVENTION

The present invention is directed to a new catalyst product and to a process of reducing organic compounds using said product. More specifically, the present invention is directed to porous base metal catalyst product having at least one precious transition metal dopant distributed on the surface area of the catalyst such that the surface to bulk ratio of dopant has a distinctly low value, as fully described herein below. The present doped catalyst product has been found to exhibit high catalytic activity and extended catalytic life compared to previously achieved values.

Hydrogenation catalysts based on highly porous nickel materials are well known. Such materials are part of a family of metal alloy derived products sold by W. R. Grace & Co.-Conn. under the trademark "Raney®". These porous materials, when microscopically viewed, take on a sponge-like appearance having tortuous pore channels throughout the nickel metal particle. Thus, such materials are generically viewed as porous or spongy metal alloy products. The metal alloy is generally composed of a major amount of a base metal selected from nickel, cobalt or copper with minor amounts of aluminum and other metals such as iron, chromium or molybdenum, as deemed appropriate for a particular application. The porous base metal catalyst product is normally referred to in terms of the metal which is the major component of the spongy metal product. These high surface area products have been found to have sites for hydrogen activation and, thus, exhibit catalytic activity when used in hydrogen reduction reactions.

It is known that the activity of spongy base metal catalysts can be enhanced ("promoted") by the incorporation of small amounts of certain transition metals. For example, French Patent 913,997 proposed incorporating chromium in up to 3.5 percent based on the content of nickel present in a Raney nickel catalyst. Promotion of catalysts was initially accomplished using transition metal elements which are readily available commodity metals, such as iron, molybdenum or chromium. These metals could be used in large amounts without causing a detrimental economic limitation to their commercial usefulness.

In general, porous base metal catalysts, such as porous nickel catalysts are formed by first producing a base metal-aluminum (preferred) or base metal-silicon alloy using conventional metallurgical techniques. The formed alloy is ground into a fine powder and classified by passing it through a sieve to provide a material having a desired particle size which is normally less than 500 microns and, preferably less than 75 microns. Larger particles are recycled for further grinding.

The alloy powder is then treated with a base to leach out a substantial amount of the aluminum metal or silica present. The base may be selected from either an inorganic (preferred) or organic compound. For example, in conventional processes an aqueous solution having from about 5 to 50 weight percent concentration of an alkali metal hydroxide (e.g., sodium hydroxide) is employed as the leaching agent. The treatment of the alloy is usually carried out at elevated temperatures of from about 40° C. to 110° C. The alloy powder can be directly added to the alkali solution or it can be formed into an aqueous suspension which is then contacted with the alkali solution. The aluminum contained in the alloy dissolves to form an alkali metal aluminate (e.g., sodium aluminate) with vigorous evolution of hydrogen. When silicon is in the alloy, the base forms the corresponding alkali metal silicate. The powder and alkali are normally allowed to remain in contact with each other for several hours at elevated temperature (e.g., 40°–110° C.) until the aluminum (or silicon) content is reduced to the desired level. The crude porous catalyst is separated from the reaction liquor and then conventionally washed with water until the wash water has a slightly alkaline pH value of about 8. The pore volume, pore size and surface area of the leached alloy will depend upon the amount of aluminum (or silicon) in the initial alloy and the degree of leaching. The nature of the porosity of the resultant base metal catalyst is one of tortuous pores throughout the volume of the catalyst particle. The resultant product normally has a pore volume (BET) of from about 0.05 to about 0.3 cc/g; an average pore diameter ranging from about 50 to 500 Angstroms; and a surface area (BET) of at least 10 $m^2/g$, preferably ranging from about 20 to about 150 $m^2/g$.

The resultant porous base metal product has been used as a hydrogenation catalyst to cause reduction of organic compounds, such as, for example, nitroorganics, to their corresponding amine compound. In order to further enhance the catalytic properties of such porous products, the addition of promoter metals, such as Group VIII transition metals (e.g., iron or chromium), has been previously accomplished by (i) adding the promoter metal to the base metal and aluminum (or silicon) when metallurgically producing the initial alloy; (ii) adding a salt of the promoter metal to the alkali leaching solution; or (iii) contacting the leached or leached and washed porous base metal catalyst with a salt solution of the promoter metal.

The process of adding promoter metal to the base metal during alloy formation, as disclosed in U.S. Pat. No. 3,781,227, has certain limitations. Firstly, it can be envisioned that some of the promoter metal is "encapsulated" in the solid body or skeleton of the base metal and not on the surface area of the resultant catalyst. In this form, the promoter metal does not cause a direct enhancement of the hydrogenation catalyst sites which are located on the surface area of the highly porous material. Further, a portion of the promoter metal may be removed during any one or all of the steps required to form the porous alloy. Thus, large amounts of a promoter metal are normally added during alloy formation to compensate for any loss during processing and through encapsulation. Because of the possible loss of promoter metal during processing and the inefficiency of encapsulated promoter metal, the alloy-addition method is not considered appropriate when the metal is a costly transition metal, such as platinum, palladium, osmium, ruthenium or the like.

Alternately, promoter metals have been added to the alkali leaching solution (see Great Britain Patent 1,119,512 and U.S. Pat. No. 3,326,725) in attempts to enhance resultant porous nickel's catalytic activity. The leaching solution is normally an alkaline aqueous or aqueous-alcoholic solution. In general, the promoter metal is introduced as an acid salt, such as a halide salt. In most instances, the leach solution does not maintain the promoter metal in solution but, instead, causes it to plate out on the outer shell of the porous base metal particle. Thus, the resultant porous particle has the promoter metal located on only a small fraction of the particle's surface area.

Spongy nickel or other base metal catalysts which have been previously formed and washed by conventional processes have been subjected to dopant metals just prior to use, in attempts to promote its catalytic activity. The dopant metal is normally introduced as an aqueous or aqueous/alcoholic solution of an acid salt, such as $PtCl_4$, $PdCl_2$, $H_2PtCl_6$ or the like. In JACS 71 1515 (1949) and JACS 72 1190 (1950) Levering et al. disclosed the addition of an organic tertiary amine to the acid salt dopant solution. These authors taught that one should use the doped spongy metal product immediately after the addition of dopant (without further washing), in order to achieve enhanced catalytic performance. Such products exhibited only slight increase in catalyst activity and substantially no improvement in their active catalyst life.

It is highly desired to provide a promoted porous base metal catalyst (e.g., Raney® nickel) which exhibits high catalytic activity after storage (maintains good initial activity) and extended catalyst life during use (exhibits slow or delayed deactivation). Further, it is desired to provide a promoted base metal catalyst which has a precious transition metal as its promoter metal and said precious transition metal is substantially uniformly distributed as a coating on the surface area of the porous metal catalyst. Thus, the precious transition metal is substantially uniformly distributed across the particle diameter of said catalyst. Still further, it is desired to provide a precious transition metal promoted porous base metal catalyst wherein said promoter metal is present in up to about 1.5 percent by weight and the promoter metal's surface to bulk ratio (as defined herein beiow) is less than 60.

SUMMARY OF THE INVENTION

The present invention provides a novel transition metal promoted porous base metal catalyst. The transition metal is present in from 0.01 to about 1.5 percent by weight, and is distributed throughout the surface area of said porous catalyst so as to have a surface to bulk distribution of not greater than 60. The present invention further provides a novel method of forming said precious transition metal promoted porous base metal catalyst. Finally, the present invention provides an improved process for hydrogenation of organic compounds utilizing said catalyst.

DETAILED DESCRIPTION

The following defined terms are used in this specification and appended claims:

"Base metal" refers to metals of iron, nickel, cobalt, copper and mixtures thereof which are used to form porous or spongy metal catalyst products. These metals may be combined (e.g., alloyed) with minor amounts of other metals (e.g., chromium, titanium, molybdenum, zinc, zirconium, aluminum) as an alloy or co-deposited coating. When more than one base metal is present in the spongy metal catalyst, all of said base metals shall be included in determining the S/B ratio, as defined below. The preferred base metals are nickel and cobalt and most preferably comprises nickel alone or with minor amounts of other metals.

"Precious metal" refers herein to transition metals of palladium, platinum, ruthenium, rhodium, rhenium, osmium, iridium and mixtures thereof.

"Dopant metal" refers to a transition metal which is distinct from the metals forming a porous base metal catalyst and is present in low concentrations in the base metal catalyst to enhance its catalytic properties (e.g., dopant precious metals, as defined below, and may also include chromium, molybdenum, titanium, zinc, iron, zironium or mixtures thereof).

"Dopant precious metal" and "promoter precious metal" each refers herein to precious transition metals of Pd, Pt, Ru, Re, Rh, Ir and Os present in small quantities on the surface area of a porous, particulate base metal for the purpose of enhancing the catalytic properties of said porous, particulate base metal. The preferred dopant transition metals are those of platinum and palladium with palladium being most preferred.

"Surface volume" refers to the outer volume or shell of a catalyst particle of the present invention which is roughly the outer 50 Angstroms of the particle's radius (i.e., extending from the outer surface of the particle inward toward the center of the particle by about 50 Angstroms).

"Surface dopant concentration" refers to the atomic ratio of dopant metal to base metal within the surface volume of a catalyst particle.

"Bulk dopant concentration" refers to the atomic ratio of dopant metal to base metal for the entire catalyst particle.

"Surface to Bulk Ratio" or "S/B" in respect to a porous base metal catalyst product, refers to ratio of surface dopant concentration to bulk dopant concentration.

The present invention is directed to a novel hydrogenation catalyst product based on a porous base metal catalyst which has up to about 1.5 weight percent of a precious transition metal selected from palladium, platinum, rhodium, ruthenium, rhenium, iridium or osmium or mixtures thereof coated on the surface area of said catalyst and having said precious transition metal of sufficiently low concentration in the particle's surface volume to provide a surface to bulk ratio, S/B, of less than 60. The present catalyst is particularly useful in reducing nitroaromatics to their respective amine derivatives.

The present catalyst is based on porous, particulate base metal catalyst product, preferably a nickel metal (e.g., Raney® nickel) product. The present invention shall be described by using a porous, particulate base metal product wherein the base metal is composed of nickel. It is to be understood that other porous, particulate base metal products (Co, Cu, Fe) can be substituted and used to form the present improved catalyst and the process of hydrogenation using the same.

The porous base metal (e.g., nickel) catalyst product is formed by conventional techniques. For example, a nickel/aluminum alloy is initially formed by a pyrometallurgical process to provide an alloy having from about 30 to 60 (preferably from about 42 to 56) weight percent nickel and from about 70 to 40 (preferably from about 58 to 44) weight percent aluminum. Small amounts of other base metals may, optionally, be present. The alloy is crushed and ground into particles having an average particle size of less than 500 micron diameter, preferably less than 75 micron diameter. The powder product is activated by leaching the aluminum from the alloy with an alkali solution, such as an aqueous solution of sodium hydroxide (preferred) or potassium hydroxide. The alkali is used at concentrations of greater than about 15 weight percent, preferably from 15 to 35 and most preferably from 20 to 35 weight percent. The leaching can be carried out at ambient temperature but preferably is conducted at elevated temperatures which can be as high as the boiling point of the leaching solution. Temperatures of from about 40° to 110° C. (preferably 60° C. to 100° C.) are suitable to cause substantial rate of leaching and removal of the aluminum metal from the alloy. When the present catalyst is contemplated for use in fixed bed reactors, the porous, particulate base metal product may have an average particle size diameter (or largest dimension) of from about 0.1 to 0.8 cm. The alloy is leached with an alkali solution described above having an alkali concentration of from about 5 to 35 weight percent, preferably from about 5 to 20 weight percent. The leaching is normally carried out at elevated temperatures of from about 30° C. to about 90° C., preferably from about 300 to 50° C.

The resultant porous particulate catalyst product is composed of base metal, such as nickel and, optionally, minor amounts (up to about 15 wt. percent preferably up to about 12 wt. percent) of other transition metals as well as residual aluminum. It is to be understood that the term "base metal" and the like used to described and define the spongy metal catalyst herein and in the appended claims shall mean (unless specifically stated otherwise) a metal product composed of a major amount (at least about 85 wt. percent) of a single base metal or a mixture of base metals (normally one base metal is in majority) which has a minor amount (up to about 15 wt. percent, preferably up to about 12 wt. percent) of other metal(s) such as chromium, titanium, molybdenum, zinc, zirconium or mixtures thereof as well as with residual aluminum. The product has a high degree of tortuous pores throughout each of the particles to provide a high surface area porous particulate catalyst product. This product is washed with water to remove the aluminate by-product. Total removal of the aluminate is not required. The washing is conducted with water having a temperature of from ambient to about 60° C., preferably between 30 and 45° C. It is preferred that the washing be conducted under an inert (e.g., $N_2$ or Ar) atmosphere or one having a dilute concentration (2–8%, preferably 3–5%) of hydrogen. The resultant particulate product normally has a pore volume (Nitrogen-BET) of from about 0.05 to about 0.3 cc/g; an average pore diameter ranging from about 50 to 500 Angstroms; a surface area (BET) of at least 10 $m^2/g$ and preferably ranging from about 20 to about 150 $m^2/g$; and an average particle diameter of less than 500 microns preferably of less than 75 microns or, when contemplated for use in fixed bed reactors, of from about 0.1 to 0.8 cm.

In the instant invention washing is continued until the effluent wash water has an alkaline pH of from at least 8 to about 12 with from 9 to 12 being preferred and from 10 to 11.5 being most preferred. The alkalinity of the aqueous slurry containing the porous base metal catalyst may be substantially the same as the alkalinity of the dopant precious metal solution to be used to from a doped catalyst, as described herein below.

The porous base metal catalyst is treated with an alkaline solution of a basic salt of the dopant precious metal to provide the catalyst of the present invention. The salts found useful in providing the unique catalyst are alkaline salts represented by the general formula $(A)_xMY_y$ wherein A represents a cation or ligand selected from ammonia, ammonium, or an alkali metal such as sodium, potassium or the like or mixtures thereof; M represents a precious transition metal, as defined below; Y represents an anion selected from halide, hydroxide, oxide, carbonate, bicarbonate, nitrate, sulfate or a $C_1$–$C_4$ carboxylate; and x and y represent integers of from 1 to about 6 to provide a neutral (charge balanced) salt product. A is preferably selected from ammonia or ammonium and most preferably selected from ammonia or if A is an alkali metal it is preferably selected from sodium. The salt should be soluble in water or alcohol or mixtures thereof and cause the solution to exhibit an alkaline pH of from 8 to 12, preferably from 9 to 11.5 and most preferably from 9.5 to 11.5. Examples of such salts are: $(NH_3)_4PdCl_2.nH_2O$, $(NH_3)_4PtCl_2.nH_2O$ $(NH_3)_4Pd(NO_3)_2.nH_2O$, $(NH_3)_4Pt(NO_3)_2.H_2O$, $[Pt(NH_3)_4][PtCl_4]$, $(NH_3)_6RuCl_3$, $NH_4ReO_4$, $(NH_3)_4ReO_4$, $KReO_4$, $NaReO_4$, $[Rh(NH_3)_5Cl]Cl_2$, $(NH_3)_4PtCl_2$, $K_2OsO_4.nH_2O$, and the like. The symbol "n" can be an integer of 0 to 4.

The precious transition metal (M) of the basic salt is selected from Pd, Pt, Ru, Rh, Re, Ir and Os and mixtures thereof with Pd and Pt being preferred and Pd being most preferred. It has been found that the presently described precious transition metals provide high catalytic activity and extended catalytic life when plated in very low amounts on the surface area of a porous base metal particulate material according to the present invention.

The porous, particulate base metal catalyst is doped with the precious transition metal according to the present invention by contacting an alkaline slurry of the porous base metal material with an alkaline solution of a precious metal salt. Alternately, one can add the solid salt directly to the affected slurry whereupon it dissolves to form the combined alkaline solution and slurry. The salt should be used in an amount such that the weight concentration of dopant transition metal in the resultant doped catalyst is from 0.01 to 1.5%, preferably from 0.05 to 1% and most preferably from 0 to 0.5% by weight based on the weight of the porous base metal catalyst. The exact amount of salt used will depend on the degree of doping desired in the finished catalyst. Normally, the alkaline salt should be added to water or water-alcohol to provide a solution of salt wherein the salt concentration is from about 5 to 40 (preferably 10–30) weight percent.

The porous base metal catalyst may, in addition to the precious transition metal dopant, be doped with a non-precious metal dopant selected from iron, chromium, molybdenum, titanium, zinc, vanadium, zirconium or mixtures thereof. They may reside as a coating on the surface in the form of a dopant metal in its zero valence state or in an oxidized state. These dopant metals may be present in up to 3 weight percent (preferably from 0.2 to 3 weight percent, most preferably from 0.5 to 2 weight percent) of dopant metal based on the weight of the porous base metal catalyst. They are added by conventional processes using dopant metal salt solutions. The doped base metal catalyst must also be doped with a dopant precious metal, as described herein.

The alkaline precious metal salt solution is contacted with an aqueous slurry of the powder porous base metal catalyst, previously formed as described above, for a sufficient time to allow substantially complete plating out of the precious transition metal onto the surface area of the base metal catalyst. The exact length of time will depend on the particle size, and specific porosity of base metal used, the pH of the solution and the concentration and particular precious transition metal present. Normally, the porous base metal catalyst and the alkaline precious transition metal salt are maintained in contact in the slurry for an extended period of time such as from about 10 to 60 minutes or longer with from about 15 to 45 minutes being preferred. The temperature at which this is conducted is not critical and can be, for example from room temperature to about 80° C. such as from 30–45° C.

The spent solution is then separated from the doped catalyst. The doped catalyst must then be washed until the wash solution is free of precious transition metal. The wash solution should be an aqueous solution (preferred) or an aqueous-alcoholic ($C_1$–$C_3$ alkanol) solution. During the washing a majority of by-product salts (e.g., $NH_4Cl$, NaCl) are removed. The washing should continue until the solution containing the doped catalyst has a pH of at least 0.25, preferably at least 0.5 and most preferably at least 1 (e.g., 1.5), unit lower than the alkaline pH at which the porous base metal catalyst and the alkaline precious transition metal dopant salt are contacted. The pH can be reduced by washing the doped catalyst with water or water-alcohol solutions (preferred) and/or by the addition of an acidic agent or a buffer agent to cause the resultant slurry to have the desired pH. It is preferred that the aqueous suspension of doped catalyst resulting from the washing(s) have a resultant pH of from about 8 to 9.5, preferably 8 to 9. It is preferred that the pH of the doping slurry be high (e.g., 9.5–12) and that the aqueous slurry of doped catalyst is at least 1 unit lower after washing. When the base metal catalyst and precious transition metal dopant are contacted in an alkaline slurry having a pH of 8 to 9.5, the product should be washed with at least 25 parts (e.g., from 25 to 100 parts) of water for each part by weight of doped catalyst solid. The wash water may be of neutral pH or slightly alkaline by the addition of a base such as $NH_4OH$, NaOH or the like. The washing can be optionally followed by an alcohol ($C_1$–$C_3$ alkanol) or water-alcohol wash. The resultant doped base metal catalyst is normally stored as an aqueous slurry until use.

In addition to washing, or in lieu thereof, the doped catalyst can be removed from the spent dopant solution and soaked in water or an aqueous alcoholic ($C_1$–$C_3$ alkanol) bath for at least 12 hours, preferably at least one day prior to use. This aging has been found to aid in achieving a highly desired catalyst of low S/B ratio.

It has been found that the doped catalyst product formed in the manner described above can be stored for an extended period of time of from one day to six months or greater prior to use without losing its catalyst activity. In addition, the doped catalyst product formed in the manner described above exhibits extended catalytic active life during use when compared to conventional catalyst products of the same material.

It is believed, though not meant to be a limitation on the subject invention, that solutions of the present precious transition metal salts are capable of penetrating into the pores of the base metal catalyst wherein precious metal electrochemically plates out when reduced by the base metal itself and/or by a fraction of the surface hydrogen of the base metal material. In addition, it has been found that beyond the removal of undeposited species, the final washing and/or soaking of the precious transition metal doped porous base metal catalyst also aids in providing a more homogeneous or even distribution of precious transition metal throughout the surface area of the product. The immediate use after addition of the dopant salt does not allow the full migration of the dopant to the interior of the particles, while the present more time-extended process completes this migration to a final, more stable configuration. Removal of undeposited species by washing also makes for a chemically enhanced product which is more compatible with a variety of hydrogenation processes and has been shown in some processes to lead to superior activity.

As stated previously, the doped catalyst of the present invention is a highly porous particulate product in which the pores are of a tortuous nature throughout each of the particles to provide a high surface area doped catalyst product. The surface area as used herein and in the appended claims is all areas assessable to nitrogen and measured by the Nitrogen-BET method. The term "surface" as used herein and in the appended claims shall be surfaces of the tortuous pores throughout said particles and of the particles, per se.

The presently produced precious transition metal doped porous base metal catalyst has been found to have a more homogeneous or even distribution of precious transition metal throughout the surface area of each particle of the porous base metal catalyst. This can be described in terms of the atomic ratio of the precious transition metal to base metal as a function of the cross-section of the catalyst particles. This distribution can be readily measured by x-ray photo-electron spectroscopy ("XPS") or electron spectroscopy for chemical analysis ("ESCA"). Another technique to determine the atomic ratio of the metals is transmission electron microscopy ("TEM"). ESCA analytical method simultaneously measures the outer surface volume or skin to a depth of about 50 Å of a large number of particles. Thus, an atomic ratio of dopant metal to basic metal in the surface volume of the particles can be measured and when compared to the bulk chemical analysis one can determine the amount of dopant enhancement at the surface versus the overall amount of dopant. It has been found that with respect to the present doped catalysts, the amount of dopant enhancement in the surface volume is low and thus the amount of dopant metal residing in the internal volume (between about 50 Å to the center of a particle) is proportionately higher than that of known doped porous catalysts. Prior known doped catalysts are products where the dopant metal is very highly concentrated in the outer surface volume and, conversely, the dopant metal is in a very low concentration in its internal volume.

The ratio of surface concentration to bulk concentration of the dopant precious metal (referred to herein after and in the appended claims as "S/B ratio") can be readily determined by ESCA analysis and bulk analysis of a product. The S/B ratio of the precious transition metal doped base metal catalyst of the present invention is less than about 60, with S/B ratios of about 10 to 50, preferably 10 to 40 being attainable. All ratios within this range of 10 to 60 being encompassed herein by this statement. In contrast, porous base-metal catalysts conventionally doped with equivalent amounts of precious metal have S/B ratios which are a multiple factor higher. Thus, if one were to plot a concentration of precious transition metal across the particle diameter, one would obtain a curve less steeply peaked at the edges (outer 50 Å) for the presently doped catalyst product than for conventionally formed catalyst product having the same degree of dopant precious metal.

The subject doped catalyst, especially the preferred doped nickel catalyst, has been found to exhibit improved catalytic activity of from about 1.2–1.8× greater than the conventional doped catalyst and over conventional doped base metal derived alloy catalysts as shown by comparative examples herein below.

The doped catalyst product of the present invention can be described as a porous, base-metal catalyst material. It is composed of a major amount (up to about 85 wt %) of a base metal, e.g. Ni, Co, Cu, or Fe, and minor amounts of up to about 15 wt. percent, preferably up to about 12 wt. percent of other metals (than the major base metal) selected from aluminum, chromium, iron, copper, molybdenum, tin, zirconium, zinc, titanium, vanadium or mixtures thereof. The porous base metal catalyst has a precious metal dopant selected from Pt, Pd, Ru, Rh, Re, Ir, Os or mixtures thereof in up to about 1.5 wt. percent (e.g., 0.01 to 1.5), preferably from 0.05 to 1, such as 0.1 to 0.9 and most preferably from 0.1 to 0.5 wt. percent (and all ranges included within said range of 0.05 to 1.5 wt. percent). The dopant precious transition metal is coated on a portion of the surface area of said porous base metal and is distributed within the particles with respect to their diameter so that its S/B ratio is less than 60, such as from about 5 to about 60, preferably less than 50, more preferably less than 40 and most preferably less than 35. The lower the S/B ratio the more preferred is the resultant catalyst.

The product of the present invention is formed by the process of contacting a solution of an alkaline salt of the precious transition metal which may be described by the formula $A_xMY_Y$ wherein each of the symbols A, M, Y, x and y are defined above, with an alkaline slurry of a porous base metal catalyst. The slurry, at a pH of from 8 to 12, preferably from about 9 to 11.5, is contacted with an alkaline salt solution, as described above, for a period of time to allow substantially all of the precious transition metal of the salt to become coated on and adhered to portions of the surface area of said porous base metal catalyst. The product of said contact is then washed until the wash solution is essentially free of dopant metal and has a pH which is at least 0.25 unit lower than the pH of the doping slurry. Alternately or in addition to the pH adjustment (preferable) the washing is conducted with at least 25 wt. parts of water for each wt. part of solid product. The doped base metal catalyst of the present invention is aged in an aqueous or aqueous-alcoholic solution for at least 12 hours preferably one day prior to use. The washed product is maintained in an aqueous or aqueous-alcoholic bath until use.

The doped catalyst product of the subject invention is useful as a hydrogenation catalyst. The present product has been found to have high catalytic activity and provide extended catalytic life when compared to conventional porous base metal catalysts which have the same dopant. The present doped catalyst products have S/B ratios which are substantially lower (more uniform doping) than conventional products.

The present invention further provides for improved catalytic hydrogenation reduction processes conducted in the presence of the above-described doped catalyst. Said processes include all hydrogenation reactions which are carried out with porous base metal catalysts, such as Raney® nickel catalysts. Examples of such reactions are described in Skeleton Catalysts in Organic Chemistry by B. M. Bogoslawski and S. S. Kaskowa and in Use of Nickel Skeleton Catalysts in Organic Chemistry VEB Deutsches Verlag der Wissenschaften, Berlin 1960 Pg. 40–124, the teachings of which are incorporated herein in their entirety by reference.

Accordingly, for example, the metal catalysts prepared according to the invention can be employed for the hydrogenation of unsaturated hydrocarbons with an ethylenic and/or triple bond, or of diene systems, of aromatic compounds, such as, for example, benzene, naphthalene, diphenyl and their derivatives, or of anthraquinone and phenanthrene, of heterocyclic compounds with nitrogen, oxygen or sulfur atoms in the ring system, of carbonyl groups, of carboxyl groups or their esters, of carbon-nitrogen compounds, such as, for example, nitriles, acid amides, oximes and ketimines, of unsaturated compounds containing halogen, sulfur, nitroso and nitro groups, of azo and azoxy compounds, of hydrazines, Schiff's bases, imines and amines, of carbon-oxygen compounds, such as, for example, alcohols, ethers, ethylene oxides and organic peroxides and ozonides, of carbon-carbon compounds and of nitrogen-nitrogen compounds.

The doped catalysts prepared according to the invention are preferably used for the hydrogenation of nitroso and nitro derivatives of aromatic compounds, unsaturated hydrocarbons, and nitriles. For example, nitrobenzene and nitrotoluene as well as dinitrobenzene and dinitrotoluene can be readily reduced to their corresponding primary amine derivative by contacting the nitro aromatic compound with hydrogen in the presence of the doped catalyst of the present invention. The reactions can be carried out at ambient temperature and pressure or at elevated temperatures of up to about 175° C., preferably between about 60° C. and 150° C. The reactions can be carried out at pressures of up to about 1000 psig with preferred pressures being from about 100 to about 500 psig. It has been unexpectedly found that the present doped catalyst provides very high degree of enhanced reactivity when used under elevated temperature and pressure conditions. Thus, conditions of temperature of from about 130 to 175° C. and pressures of from 300 to 500 psig are preferred. The use of the doped catalyst of the present invention is exemplified herein by illustration of hydrogenation reduction of para-nitrotoluene.

The hydrogenation may be carried out in a continuous sump phase hydrogenation apparatus, which consists of a number of reactors of customary construction connected in series, with the aid of which a hydrogen cycle is produced. Other conventional batch and continuous apparatus may be used. The catalyst of the present invention can be suspended in an aqueous-alcoholic mixture (e.g., a $C_1$–$C_3$ alkanol). Alternately, the catalyst may be of a fixed bed type (larger particle size of from about 0.1to 0.8 cm) used in a packed bed reactor with either a liquid or vapor phase reaction mixture conventionally used.

The doped catalyst of the present invention can be suspended in the hydrogenation apparatus in an ethanol/water mixture, for example with a mixture composed of 95% by weight of ethanol and 5% by weight of water, as the solvent. A solution of para-nitrotoluene in the ethanol/water mixture is formed and to it the catalyst is added. The treatment is then carried out at elevated pressure, for example 60 to 500 psig of hydrogen pressure, and at temperatures of 75° C.–140° C.

The following examples are given for illustrative purposes only and are not meant to be a limitation on the invention as defined by the claims appended hereto. All parts and percentages are by weight unless otherwise indicated. Further, any range of numbers recited in the specification or claims, such as that representing a particular set of properties, conditions, physical states or percentages is intended to literally incorporate expressly herein any number falling within such range, including any subset of numbers within any range so recited.

EXAMPLE I

Preparation of Base Metal Catalyst

A previously formed nickel-aluminum alloy composed of about 42 weight percent nickel/58 weight percent aluminum was ground into a powder having particle size of about 30–40 microns average diameter. The powdered alloy was intermittently added in small portions to a 30 weight percent sodium hydroxide solution which was preheated to 80° C. prior to introduction of alloy. The weight ratio of NaOH (solid) to Al of the alloy was about 2.7:1. The addition was carried out at a rate of about 1000 g alloy powder per hour. After completion of the addition of alloy powder, the resultant slurry was maintained at 80° C. with agitation for about 4 hours.

The resultant spongy nickel catalyst was separated from the slurry liquid by decantation followed by washing of the solid catalyst until the spent wash solution had a pH of about 9. The washing of the solid catalyst was carried out by cyclic addition of water at 45° C. followed by stirring, settling of solids and decanting of the wash water.

The resultant spongy nickel metal catalyst was stored as a 50 wt. percent aqueous slurry.

EXAMPLE II

Precious Metal Doped Nickel Catalyst

A series of nickel catalysts were prepared in the same manner as described in Example I above except that the pH of the final wash water was varied. Separate slurries were formed with pH of from 8 to 12 and each catalyst was then doped with a precious metal, as described below.

Standardized aqueous solutions of Pd salts and of Pt salts were formed. These solutions had a pH of about 9 to 10.

A series of doped catalyst were formed by introducing with agitation a portion of a standardized precious metal salt solution having a precious metal content of from 0.1 to 1.0 weight percent precious metal based on the spongy nickel catalyst (solid content) of the treated slurry. The treated slurry was maintained under agitation for about 30 minutes. The agitation was then stopped and the solids allowed to settle. A portion of the liquid was decanted and analyzed for precious metal content. The analysis showed no precious dopant metal present in the spent liquid. The slurry was washed by cyclical water/decantation to a final pH of about 9 and with at least 25 parts by weight of water for each part of catalyst product. The resultant precious metal doped spongy nickel catalysts were stored under water for at least one day prior to being tested and used.

Table I below provides the data and description with respect to each of the series of samples produced. This description includes:

precious metal dopant salt (PM)
dosage of dopant in the doped catalyst (% precious metal based on nickel of spongy catalyst)
pH of dopant solution
pH of catalyst slurry before doping treatment
pH of catalyst slurry after (post) doping treatment
bulk analysis (ICP) of doped catalyst
Surface Analysis (XPS) of doped catalyst
Surface to Bulk (S/B) Ratio Bulk chemical analysis was analyzed by Inductive Coupled Plasma-Atomic Emission Spectroscopy ("ICP"). Each sample was washed with water and then completely dissolved in a mixture of HCl/NHO$_3$ acid (3:1) solution. The sum of the percent assays determined was normalized to 100%. The weight percentages for precious metal, nickel, and residual aluminum are reported in Table I as well as the atomic ratio of precious metal to nickel.

The average precious metal dopant concentration at the doped catalyst particles' outer shells (surface volume) was determined by X-ray Photoelectron Spectroscopy (XPS). For each measurement, a small sample of about 0.5 g water-wet catalyst was removed from its slurry and dried in a U-shaped tube under flowing helium gas at a temperature of 130° C. The dried sample is then sealed in the tube and transported to the XPS instrument. The sample was introduced via an antechamber to the XPS instrument. XPS measurements were carried out on a PHI 5600 ESCA system (φ Physical Electronic). The catalyst was handled under an Argon atmosphere within an environmentally controlled glove box. Moisture content was no higher than 0.40 ppm and oxygen content was generally 0.00 ppm within the glove box environment.

Spectra were obtained using an aluminum x-ray source operating at 14.8 kV/25 mA energy and the detector positioned at 45° relative to the material being analyzed. Instrument calibration was performed using a Cu reference standard after 10 minutes sputtering in Argon. Because the $2_{p3/2}$ and $3_{p3/2}$ photoelectron peak energies of Cu are widely separated in energy, measurement of these peak binding energies provided a quick and simple means of checking the accuracy of the binding energy scale.

The material was loaded as a thin layer onto double-sided tape mounted to a 1 inch diameter stainless steel stub. The stub was placed in an enclosed transfer vessel and mounted onto the intro chamber of the XPS instrument. The sample was transferred in vacuo ($10^{-6}$ torr) into the main analysis chamber and further vacuum of $10^{-8}$ to $10^{-9}$ torr was achieved. A 5 minute surface scan to identify all detectable elements from 1–1100 eV was performed. Based on the findings from the survey, a 60 minute detailed scan on selected elements was performed with an energy resolution of 0.125 eV. For convenience, the spectral data were imported into an external curve-fitting software package (MULTIPAK v2.2a). Other conventional methods can be used. All the curve-fitting and atomic concentration functions were performed using this software. Sensitivity factors for each element were automatically configured within the software and used in the atomic concentration calculations.

The Surface/Bulk ("S/B") ratio was calculated as follows (e.g., with Pd and Ni as dopant and base metal, respectively):

$$S/B \text{ ratio} = \frac{\text{surface Pd/Ni}}{\text{bulk Pd/Ni}} \text{ which is}$$

$$\frac{[(XPS \text{ Pd atom concentration})/(XPS \text{ Ni atom concentration})]}{[(ICP \text{ bulk \% Pd/atomic wt Pd})/(ICP \text{ bulk \% Ni/atomic wt. Ni})]}$$

EXAMPLE III

A sample was made in the same manner as described above in Example II for Samples 2D–2F except that the base metal catalyst was nickel based having about 2 wt. % Fe and 2 wt. % Cr in the spongy catalyst.

The dopant catalyst was analyzed in the same manner as described above and the results are reported as Sample 3 in Table I below.

TABLE I

| Example | Dopant (PM) Salt | | | Catalyst Slurry pH | | Bulk Analysis ICP | | | | Surface Vol. PM/Ni (XPS) | S/B Ratio |
|---|---|---|---|---|---|---|---|---|---|---|---|
| | Target Conc. | Salt | pH | Pre-doping | Post-doping | % PM | % Ni | % Al | Atom PM/Ni | | |
| 1 | — | None | — | — | — | — | — | — | — | — | — |
| 2A | ~1% | (NH$_3$)$_4$PdCl$_2$.H$_2$O | 9.1 | 11 | 9.6 | 1.17 | 92.9 | 5.6 | 0.00695 | 0.17 | 24 |
| 2B | 0.5% | (NH$_3$)$_4$PdCl$_2$.H$_2$O | 9.1 | 11 | 9.6 | 0.53 | 93.9 | 5.3 | 0.00311 | 0.10 | 32 |
| 2C | 0.5% | (NH$_3$)$_4$PdCl$_2$.H$_2$O | 9.1 | 11 | 9.9 | 0.46 | 93.8 | 5.4 | 0.00270 | — | — |
| 2D | 0.25% | (NH$_3$)$_4$PdCl$_2$.H$_2$O | 9.1 | 11 | 9.7 | 0.25 | 94.0 | 5.5 | 0.00147 | 0.06 | 41 |
| 2E | 0.25% | (NH$_3$)$_4$PdCl$_2$.H$_2$O | 9.1 | 8 | 9.0 | 0.26 | 94.3 | 5.1 | 0.00152 | 0.08 | 53 |
| 2F | 0.25% | (NH$_3$)$_4$PdCl$_2$.H$_2$O | 9.1 | 9 | 8.9 | 0.28 | 93.8 | 5.7 | 0.00165 | 0.03 | 18 |
| 2G | 0.25% | (NH$_3$)$_4$PdCl$_2$.H$_2$O | 9.1 | 10 | 9.0 | 0.25 | 93.8 | 5.7 | 0.00147 | 0.04 | 27 |

TABLE I-continued

| | Dopant (PM) Salt | | | Catalyst Slurry pH | | Bulk Analysis ICP | | | Atom | Surface Vol. PM/Ni | |
| | Target | | | | | | | | | | |
| Example | Conc. | Salt | pH | Pre-doping | Post-doping | % PM | % Ni | % Al | PM/Ni | (XPS) | S/B Ratio |
|---|---|---|---|---|---|---|---|---|---|---|---|
| 2H | 0.25% | $(NH_3)_4PdCl_2 \cdot H_2O$ | 9.1 | 11 | 10.3 | 0.22 | 92.9 | 6.6 | 0.00131 | 0.03 | 23 |
| 2I | 0.25% | $(NH_3)_4PdCl_2 \cdot H_2O$ | 9.1 | 12 | 12. | 0.27 | 93.5 | 5.9 | 0.00159 | 0.05 | 31 |
| 2J | 0.25% | $(NH_3)_4PtCl_2 \cdot H_2O$ | 8.1 | 11 | 10.9 | 0.27 | 94.3 | 5.1 | 0.00158 | — | — |
| 2K | 0.125% | $(NH_3)_4PdCl_2 \cdot H_2O$ | 9.1 | 11 | 10.8 | 0.14 | 93.6 | 6.0 | 0.00083 | 0.02 | 24 |
| 3 | 0.25% | $(NH_3)_4PdCl_2 \cdot H_2O$ | 9.1 | 11 | 11.0 | 0.25 | 89.3 | 10.2 | 0.00155 | 0.08 | 52 |

EXAMPLE IV

A series of catalytic hydrogenation reactions to convert 4-nitrotoluene to 4-methyl aniline were carried out using Pd doped nickel based catalyst, as follows:

10 parts of a selected catalyst was transferred into a reaction flask, washed twice with 12000 parts of 95% ethanol/5% water (Pharmco Products). Then 12000 parts of 95% ethanol containing 500 parts of 4-nitrotoluene (Aldrich) was introduced into the reaction flask. The reaction flask was evacuated and filled with hydrogen gas. Stirring of the solution at 1200 rpm was commenced when the temperature reached 75° C. and the pressure was at 60 psig. Each reaction was conducted in duplicate.

The hydrogenation reaction was monitored using a multipoint absorption reactor system which measured the gas uptake at constant reaction pressure. This was accomplished by measuring the pressure drop in a pre-calibrated ballast reservoir. The system was capable of recording the parameters of reaction time, pressure, temperature and pressure in ballast reservoir. These parameters were recorded at the rate of 12 points/minute during the first 10 minutes of reaction and then at increments of each 1 percent pressure drop in the ballast reservoir. The data obtained were plotted versus time and the reaction rates were calculated from the slope in the linear portion of the hydrogen uptake. At the completion of each reaction, aliquots of reaction solution were taken and analyzed by gas chromatography-mass spectrometry. The only two materials identified were the starting 4-nitrotoluene and the 4-methylaniline product.

The results are given in Table II below.

TABLE II

Catalyst Activity
4-nitrotoluene conversion at 75° C./60 psig

| Sample | Pd* wt. % | Base Catalyst predoped pH | Cat. Activity rate mmol $H_2$/min-g catalyst |
|---|---|---|---|
| 2E | 0.25 | 8 | 57 |
| 2F | 0.25 | 9 | 77 |
| 2G | 0.25 | 10 | 77 |
| 2H | 0.25 | 11 | 85 |
| 2I | 0.25 | 12 | 62 |
| 2J | 0.50 | 11 | 73 |
| 2K | 0.125 | 11 | 66 |

*source of Pd was $(NH_3)_4PdCl_2 \cdot H_2O$

EXAMPLE V

A series of hydrogenation reactions of 4-nitrotoluene was conducted using different combinations of temperature and pressure conditions (a matrix of Temp/Pressure combinations using 200 and 400 psig and 125° C. and 140° C.). The catalyst used was palladium doped nickel based catalyst (2G) described in Example II above.

Each of the hydrogenation reactions were conducted using a Bench Top EZE Seal Reactor (Autoclave Engineers) which is divided into a feed section, a high pressure section and a low pressure section. The reactor was also equipped with the pressure drop sensing monitor described in Example IV above. The reactor feed section is equipped with lines for hydrogen, nitrogen and vacuum. The high pressure section of the reactor has a forward pressure regulator, a varying volume ballast reservoir and a pressure transducer. The low pressure section is in-line with the reactor and its pressure was monitored by a pressure transducer.

During each reaction, the gas consumption in the reactor section caused a continuous pressure drop in the calibrated ballast reservoirs. The pressure of the ballast, the autoclave pressure, the tachometer reading, the hydrogen consumption and the reaction temperature were continuously monitored and recorded as described in Example IV.

In each reaction, 65 parts of wet catalyst (2G) was transferred into the reactor beaker, washed with 12000 parts 95% ethanol/5% water (Pharmco Products) and then the reactor was sealed, and connected to EZE reactor. The system was evacuated and filled with hydrogen followed by the addition of 28000 parts of an ethanol solution which contains 3500 parts of 4-nitrotoluene via a gas-tight syringe. The reactor was pressurized with hydrogen to the indicated pressure (either 200 or 400 psig) and then heated to the indicated temperature (either 125° C. or 140° C.). When the temperature/pressure parameters were reached, stirring (1300 rpm) and data acquisition was simultaneously initiated. After gas absorption ceased the reactor was cooled and the liquid phase extracted under pressure. Each set of reaction conditions was used in duplicate runs. Table III below provides the initial catalyst activity in terms of conversion of 4-nitrotoluene (mmol $H_2$/min) for each of the four conditions of the temperature/pressure matrix.

TABLE III

Initial Catalyst Activity
(Sample 2G)
(mmol $H_2$/min)

| | Reaction Temperature | |
| $H_2$ Pressure psig | 125° C. | 140° C. |
|---|---|---|
| 200 | 45 | 3.4 |
| 400 | 49 | 9.6 |

The above results show that increases in either temperature or pressure alone do not enhance the catalytic activity of the present catalyst (similar results are achieved with acid salt doped catalyst). However, the subject catalyst shows synergistic high catalyst activity under increased combined temperature/pressure conditions.

EXAMPLE VI

A series of catalyst were tested for their response to recycling reactions (each used in five consecutive (5) batch reactions). The series included catalyst 2G and, for comparative purposes, Catalysts formed according to examples I (Sample I) and Comparative Example II (Sample 5F) (see below). The reactions were each carried out using the procedure and reactor equipment described in Example VIII under temperature/pressure combined conditions of 140° C. and 400 psig. At the end of the fifth cycle, the substrate (4-nitrotoluene) to catalyst contact ratio reached a total of 250.

The results are shown in Table IV below. The precious transition metal doped catalyst of the present invention exhibited superior activity over the cycles tested when compared to undoped catalyst (Sample 1) and to conventional acid salt doped catalyst (Sample 5F).

TABLE IV

Catalyst Activity in Batch Recycle

| | Activity mmol H$_2$/min | | |
|---|---|---|---|
| Cycle | Sample 2G | Sample 5F | Sample 1 |
| 1 | 9.6 | 7.4 | 5.5 |
| 2 | 8.9 | 5.0 | 3.9 |
| 3 | 5.0 | 2.9 | 2.6 |
| 4 | 3.7 | 3.1 | 2.3 |
| 5 | 3.2 | 3.2 | 2.2 |

The above shows that undoped base metal catalyst had lower catalytic activity in each of the five cycles than doped catalyst. However, of the doped catalysts, the present doped catalyst exhibited higher initial and overall activity than conventional acid salt doped catalyst.

COMPARATIVE EXAMPLE I

For comparative purposes, a sample of base metal catalyst was prepared in the same manner as in Example II above except that the dopant salt solution was formed with a solution of palladium salt $(NH_3)_4Pd(OH)_2$—$H_2O$, having a pH of 13.7. The resultant doped catalyst is labeled 1-Comparative. This high pH dopant solution was used to prepare a doped catalyst formed with the same nickel base catalyst of samples 2D (having a pre-dopant pH of 11) and the same concentration (0.25 wt. percent) of Pd metal dopant of those samples. The results are shown in Table I-C below and compared with those of samples 2D.

TABLE I-C

| | | | | Catalyst Slurry pH PM/Ni (atomic) | | |
|---|---|---|---|---|---|---|
| Sample | Dopant Sol. pH | Pre-Doping | Post-Doping. | ICP | XPS | S/B |
| 2D | 9.1 | 11 | 9.7 | 0.00147 | 0.06 | 41 |
| 1-Comparative | 13.7 | 11 | 11.9 | 0.0013 | 0.15 | 116 |

COMPARATIVE EXAMPLE II

For comparative purposes, a series of palladium metal doped nickel base metal catalysts were formed using the same procedure described in Example II above except that acidic precious metal salt solutions were used to provide the dopant metal. The samples were analyzed in the same manner as described in Example II using ICP and XPS techniques. The results are given in Table II-C. The resultant doped catalyst products had very high S/B ratio showing that a much greater fraction of the doped metal resided in the surface volume of the catalyst particles.

TABLE II-C

| | Dopant (PM) Salt | | | | | Bulk Analysis ICP | | | | Surface Vol | |
| | Target | | | Catalyst Slurry pH | | | | | Atom | PM/Ni (atomic) | |
| Sample | Conc. | Salt | pH | Pre-doping | Post-doping | % PM | % Ni | % Al | PM/Ni | (XPS) | S/B Ratio |
|---|---|---|---|---|---|---|---|---|---|---|---|
| 5A | 1% | PdCl$_2$ | -0.2 | 9 | 6.7 | 0.92 | 93.8 | 5.0 | 0.00541 | 0.63 | 116 |
| 5B | 0.5% | PdCl$_2$ | -0.2 | 11 | 7.6 | 0.51 | 92.3 | 6.9 | 0.00305 | 0.27 | 89 |
| 5C | 0.25% | Na$_2$Pd(II)Cl$_4$ | 4.0 | 11 | 10.2 | 0.29 | 93.8 | 5.6 | 0.00171 | 0.17 | 100 |
| 5D | 0.25% | Na$_2$Pd(IV)Cl$_6$ | 2.0 | 11 | 10.2 | 0.28 | 93.5 | 5.9 | 0.00165 | 0.25 | 151 |
| 5E | 0.25% | Pd(NO$_3$)$_2$ | -0.7 | 11 | 11.1 | 0.28 | 93.7 | 5.7 | 0.00165 | 0.17 | 103 |
| 5F | 0.25% | PdCl$_2$ | -0.2 | 8.7 | 8.0 | 0.25 | 92.9 | 6.6 | 0.00149 | 0.18 | 121 |
| 5G | 0.25% | PdCl$_2$ | -0.2 | 9.0 | 8.1 | 0.26 | 93.9 | 5.5 | 0.00153 | 0.25 | 164 |
| 5H | 0.25% | PdCl$_2$ | -0.2 | 10 | 7.3 | 0.25 | 93.9 | 5.6 | 0.00147 | 0.17 | 116 |
| 5I | 0.25% | PdCl$_2$ | -0.2 | 11 | 9.2 | 0.27 | 93.3 | 6.1 | 0.00160 | 0.13 | 81 |
| 5J | 0.25% | PdCl$_2$ | -0.2 | 12 | 12.6 | 0.25 | 94.4 | 5.1 | 0.00146 | 0.13 | 89 |
| 5K | 0.125% | PdCl$_2$ | -0.2 | 11 | 8.0 | 0.124 | 95.0 | 4.6 | 0.00072 | 0.08 | 111 |

The data in Tables I-C and II-C shows a strong dependency of the S/B ratio on the type of salt used and the, thus pH of the dopant solution which provides the dopant precious metal. The high S/B ratio attained when an acidic dopant salt or a very alkaline dopant salt (Sample 1-Comparative) is used indicated that one does not achieve the same type of dopant distribution as when using dopant salts having a pH in the range of from about 8–12.

COMPARATIVE EXAMPLE III

For comparative purposes, a series of Pd acid salt formed catalysts, Samples 5G to 5J were tested in the same manner as above and compared to Samples 2H, 2I, 2F, and 2K in Table III-C below. Each compared pair of samples contained 0.25 wt. % Pd dopant and were formed using spongy nickel metal catalyst slurries having the same pre-doping pH condition.

TABLE III-C

| Salt | Ni catalyst pre-doped pH | | | |
|---|---|---|---|---|
| | 9 | 10 | 11 | 12 |
| NH3PdCl2.H2O | 77 | 77 | 85 | 62 |
| PdCl$_2$ | 61 | 74 | 68 | 61 |

The present basic salt formed doped catalyst provided a higher activity in each comparison.

COMPARATIVE EXAMPLE IV

For comparative purposes, duplicate hydrogenation reactions of 4-nitrotoluene were conducted in the same manner as described in Example V at reaction conditions of 140° C. and 400 psig except that the palladium doped nickel based catalyst used was Sample 2G prior to washing and aging. The catalytic activity was only 7.4 mmol $H_2$/min compared to the 9.6 mmol $H_2$/min value obtained under the same conditions with the catalyst of the present invention.

What is claimed is:

1. A product comprising a porous particulate metal material comprising a porous sponge base metal alloy having a major amount of a metal selected from Ni, Co, Cu, Fe or mixtures thereof, and havinq from about 0.01 to about 1.5 weight percent of a precious transition metal coated on the surface of said base metal alloy and distributed throughout said particulate material to have a S/B ratio of less than 60.

2. The product of claim 1 wherein the precious transition metal is selected from Ru, Rh, Re, Pd, Pt, Os, Ir or mixtures thereof.

3. The product of claim 2 wherein the precious transition metal is selected from Pt or Pd or mixtures thereof and the base metal is selected from nickel, cobalt or mixtures thereof.

4. The product of claim 3 wherein the precious transition metal is present in from 0.05 to 1 weight percent and the S/B ratio is from about 10 to 50.

5. The product of claim 3 wherein the porous particulate base metal material has an average particle diameter of less than 500 microns and a surface area of at least 10 m$^2$/g.

6. The product of claim 5 wherein the porous particulate base metal material has an average particle diameter of less than 75 microns and a surface area of at least 10 m$^2$/g.

7. The product of claim 2 wherein the S/B ratio is from about 10 to about 40.

8. The product of claim 2 wherein the precious transition metal is present in from 0.05 to 1 weight percent and the S/B ratio is from about 10 to 50.

9. The product of claim 2 wherein the porous particulate base metal material has an average particle diameter of less than 500 microns and a surface area of at least 10 m$^2$/g.

10. The product of claim 9 wherein the porous particulate base metal material has an average particle diameter of less than 75 microns and a surface area of at least 10 m$^2$/g.

11. The product of claim 2 wherein the porous particulate base metal material has a particle diameter range of from 0.1 to 0.8 cm and a surface area of at least 10 m$^2$/g.

12. The product of claim 1 wherein the S/B ratio is from about 10 to about 40.

13. The product of claim 2 wherein the porous particulate base metal material has a surface area of from 20 to 150 m$^2$/gm; the promoter precious metal is selected from Pt or Pd or mixtures thereof; the amount of promoter precious metal in the product is from 0.05 to 1 weight percent; and the S/B ratio is from about 10 to 40.

14. The product of claim 1 wherein the sponge porous base metal alloy comprises at least 85 weight percent of a base metal selected from Ni, Co, Cu, or Fe or mixtures thereof and further comprises up to 15 weight percent of aluminum, molybdenum, chromium, iron, copper, tin, zirconium, zinc, titanium, vanadium or mixtures thereof.

15. The product of claim 14 wherein the precious transition metal is present in from 0.05 to 1 weight percent and the S/B ratio is from about 10 to 50.

16. The product of claim 14 wherein the porous particulate base metal material has a surface area of from 20 to 150 m$^2$/gm; the promoter precious metal is selected from Pt or Pd or mixtures thereof; the amount of promoter metal in the product is from 0.05 to 1 weight percent; and the S/B ratio is from about 10 to 40.

17. The product of claim 14 herein the porous particulate base metal material has an average particle diameter of less than 500 microns and a surface area of at least 10 m$^2$/g.

18. The product of claim 1 wherein the porous particulate metal material further has up to about 3 weight percent of a metal selected from the group consisting of molybdenum, chromium, zirconium, zinc, titanium, vanadium, iron or mixtures thereof on the surface of said base metal material.

19. The product of claim 18 wherein the precious transition metal is present in from 0.05 to 1 weight percent and the S/B ratio is from about 10 to 50.

20. The product of claim 18 wherein the porous particulate base metal material has a surface area of from 20 to 150 m$^2$/gm; the promoter precious metal is selected from Pt or Pd or mixtures thereof; the amount of promoter precious metal in the product is from 0.05 to 1 weight percent; and the S/B ratio is from about 10 to 40.

21. The product of claim 1 wherein the porous particulate base metal material has a particle diameter range of from 0.1 to 0.8 cm and a surface area of at least 10 m$_2$/g.

22. The product of claim 1 wherein the porous particulate base metal material has a surface area of from 20 to 150 m$^2$/gm; the promoter precious metal is selected from Pt or Pd or mixtures thereof; the amount of promoter precious metal in the product is from 0.05 to 1 weight percent; and the S/B ratio is from about 10 to 40.

23. A product comprising a porous particulate metal material comprising a sponge porous base metal alloy having at least about 85 weight percent of a base metal selected from Ni, Co, Cu or Fe or mixtures thereof and further comprising up to 15 weight percent of aluminum, molybdenum, chromium, iron, copper, tin, zirconium, zinc, titanium, vanadium or mixtures thereof, and further having from about 0.01 to about 1.5 weight percent of a precious transition metal coated on the surface of said base metal and distributed throughout said porous particulate material to have a S/B ratio of less than 60.

24. The product of claim 23 wherein the precious transition metal is selected from Ru, Rh, Re, Pd, Pt, Os, Ir or mixtures thereof.

25. The product of claim 23 wherein the precious transition metal is selected from Pt or Pd or mixtures thereof and the base metal is selected from nickel, cobalt or mixtures thereof.

26. The product of claim 25 wherein the precious transition metal is present in from 0.05 to 1 weight percent and the S/B ratio is from about 10 to 50.

27. The product of claim 26 wherein the porous particulate metal material has an average particle diameter of less than 500 microns and a surface area of at least 10 m$^2$/g.

28. The product of claim 25 wherein the porous particulate metal material has an average particle diameter of less than 500 microns and a surface area of at least 10 $m^2/g$.

29. The product of claim 24 wherein the precious transition metal is present in from 0.05 to 1 weight percent and the S/B ratio is from about 10 to 50.

30. The product of claim 29 wherein the porous particulate metal material has an average particle diameter of less than 500 microns and a surface area of at least 10 $m^2/g$.

31. The product of claim 24 wherein the porous particulate metal material has an average particle diameter of less than 500 microns and a surface area of at least 10 $m^2/g$.

32. The product of claim 23 wherein the porous particulate metal material further has up to about 3 weight percent of a metal selected from the group consisting of molybdenum, chromium, zirconium, zinc, titanium, vanadium, iron or mixtures thereof on the surface of said base metal material.

33. The product of claim 32 wherein the precious transition metal is present in from 0.05 to 1 weight percent and the S/B ratio is from about 10 to 50.

34. The product of claim 33 wherein the porous particulate metal material has an average particle diameter of less than 500 microns and a surface area of at least 10 $m^2/g$.

35. The product of claim 32 wherein the porous particulate metal material has an average particle diameter of less than 500 microns and a surface area of at least 10 $m^2/g$.

36. The product of claim 23 wherein the precious transition metal is present in from 0.05 to 1 weight percent and the S/B ratio is from about 10 to 50.

37. The product of claim 36 wherein the porous particulate metal material has an average particle diameter of less than 500 microns and a surface area of at least 10 $m^2/g$.

38. The product of claim 23 wherein the porous particulate metal material has an average particle diameter of less than 500 microns and a surface area of at least 10 $m^2/g$.

39. The product of claim 5, 6, 9, 10, 11, 17, 21, 27, 28, 30, 31, 34, 35, 37 or 38 wherein the S/B ratio is from about 10 to about 50.

* * * * *